United States Patent
Sacle et al.

(10) Patent No.: US 9,114,889 B2
(45) Date of Patent: Aug. 25, 2015

(54) METHOD AND SYSTEM FOR MONITORING AIRCRAFT FLIGHT PHASE ON APPROACH TO A RUNWAY

(71) Applicant: THALES, Neuilly sur Seine (FR)

(72) Inventors: Jérôme Sacle, Toulouse (FR); François Coulmeau, Toulouse (FR); Loïc Charles, Toulouse (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 14/275,057

(22) Filed: May 12, 2014

(65) Prior Publication Data

US 2014/0343764 A1    Nov. 20, 2014

(30) Foreign Application Priority Data

May 14, 2013    (FR) .................................... 13 01106

(51) Int. Cl.
*B64D 45/04* (2006.01)
*G05B 19/416* (2006.01)
*G05D 1/06* (2006.01)
*G08G 5/00* (2006.01)
*G08G 5/02* (2006.01)

(52) U.S. Cl.
CPC ............. *B64D 45/04* (2013.01); *G05B 19/416* (2013.01); *G05D 1/0676* (2013.01); *G08G 5/0021* (2013.01); *G08G 5/025* (2013.01)

(58) Field of Classification Search
CPC combination set(s) only.
See application file for complete search history.

(56) References Cited

U.S. PATENT DOCUMENTS

| 7,132,960 B2 * | 11/2006 | Glover .......................... 340/945 |
| 7,161,501 B1 * | 1/2007 | Lynch et al. .................. 340/971 |
| 2004/0167685 A1 * | 8/2004 | Ryan et al. ...................... 701/16 |
| 2008/0140272 A1 | 6/2008 | Zadrozynski et al. |
| 2009/0112454 A1 | 4/2009 | Wachenheim et al. |

(Continued)

FOREIGN PATENT DOCUMENTS

| FR | 2 885 439 | 11/2006 |
| FR | 2 908 220 | 5/2008 |

(Continued)

OTHER PUBLICATIONS

French Search Report dated Feb. 26, 2014, from corresponding French Application No. 1301106.

*Primary Examiner* — Thomas Tarcza
*Assistant Examiner* — Edward Pipala
(74) *Attorney, Agent, or Firm* — Troutman Sanders LLP

(57) ABSTRACT

The method concerns monitoring the approach phase of an aircraft to a runway. This method includes determining successive gateways of the aircraft relative to at least one characteristic point of an approach flight plan of the aircraft or relative to the landing location, and measuring the aircraft speed upon crossing a given gateway. The method further comprises computing a minimum deceleration distance up to a predetermined target speed associated with the gateway following said given gateway, the minimum deceleration distance being an estimated flight distance corresponding to the speed reduction of the aircraft from the measured speed to said target speed; comparing the computed minimum deceleration distance with the distance remaining to be flow to the following gateway; and generating an alert, intended for the aircraft crew, when the distance remaining to be flown to the following gateway is smaller than the computed minimum deceleration distance.

15 Claims, 3 Drawing Sheets

(56) References Cited

U.S. PATENT DOCUMENTS

2010/0036551 A1 2/2010 Lacaze et al.
2010/0125382 A1 5/2010 Wachenheim et al.
2010/0198432 A1 8/2010 Ishihara et al.

FOREIGN PATENT DOCUMENTS

FR 2 923 032 5/2009
FR 2 938 682 5/2010

* cited by examiner

METHOD AND SYSTEM FOR MONITORING AIRCRAFT FLIGHT PHASE ON APPROACH TO A RUNWAY

CROSS-REFERENCE TO RELATED APPLICATIONS

The present application claims priority to French Patent Application No. 13 01106 filed May 14, 2013. The entirety of the French application is incorporated herein by reference.

FIELD OF THE INVENTION

The present invention relates to a method for monitoring an aircraft approach phase to a runway.

BACKGROUND

The present invention relates to a method for monitoring an aircraft approach phase to a runway. The aircraft has a speed, and the method includes determining successive gateways of the aircraft relative to at least one characteristic point of an approach flight plan of the aircraft or relative to the runway location, and measuring the speed of the aircraft upon crossing a given gateway.

The invention also relates to a computer program product including software instructions which, when implemented on a computer, implement such a monitoring method.

The invention also relates to a system for monitoring the approach phase of the aircraft toward a runway.

The approach phase to the runway is a particularly important phase in terms of safety, since the aircraft landing phase depends greatly on that prior approach phase, and a relatively high percentage of aircraft accidents occur during the landing phase. Different methods and devices have thus been considered in order to assist the crew of the aircraft in managing these approach and landing phases.

A method of the aforementioned type is known from document US 2010/0198432 A1. The instantaneous speed of the aircraft is measured at a predetermined passage point relative to the runway location, and an excess speed alarm is generated for the aircraft crew when the measured instantaneous speed is above a predetermined maximum speed.

However, the excess speed alarm is sometimes generated late, and safety is then not optimal during the approach and landing phases.

SUMMARY

The aim of the invention is therefore to propose a method and a system for monitoring the aircraft approach phase making it possible to improve flight safety, while best helping the aircraft crew to manage that approach phase.

To that end, the invention relates to the aforementioned method wherein the method further includes computing a minimum deceleration distance up to a predetermined target speed associated with the gateway following said given gateway, the minimum deceleration distance being an estimated flight distance corresponding to the speed reduction of the aircraft from the measured speed to said target speed, comparing the computed minimum deceleration distance to the remaining distance to be flown to the following gateway, and generating an alert, for the aircraft crew, when the distance remaining to be flown to the following gateway is smaller than the computed minimum deceleration distance.

According to other advantageous aspects of the invention, the monitoring method has one or more of the following features, considered alone or according to any technically possible combinations the last gateway before the runway is situated at a predetermined altitude above the runway, the predetermined altitude is an altitude substantially equal to 304.8 m or 152.4 m above the runway the aircraft includes landing gear and flaps, the landing gear being in the retracted configuration or the deployed configuration, and each flap having a turning angle relative to a corresponding wing of the aircraft, and the minimum deceleration distance is computed based on the turning angle of the flaps and the configuration of the landing gear; the minimum deceleration distance is recomputed each time the turning angle of the flaps and/or the configuration of the landing gear changes; the minimum deceleration distance is further computed based on a corrected wind slope, the corrected wind slope being computed from a ground slope; the ground slope has a predetermined value or a value computed as a function of the difference between the altitude of the aircraft and the altitude of the following gateway; the minimum deceleration distance is further computed based on the mass of the aircraft; the aircraft is adapted to move following a final level-off before beginning its descent along the final approach axis toward the runway, the final level-off having an altitude above the runway, and the minimum deceleration distance is further computed based on said altitude of the final level-off; during the approach phase, the aircraft is adapted to move along a final approach axis toward the runway, and at least one gateway is determined as a function of a predefined distance relative to a point of the final approach axis, the point of the final approach axis is the final approach fix situated at an altitude substantially equal to 914.4 m above the runway; the method further includes: comparing the speed measured upon crossing a given gateway with a maximum predetermined speed, and generating an excess speed alert, for the aircraft crew, when the measured speed is above the maximum predetermined speed; and the aircraft includes an automatic pilot device, and the method further includes the automatic reduction of the aircraft speed using the automatic pilot device when the speed measured upon crossing the given gateway is above the predetermined maximum speed.

The invention also relates to a computer program product including software instructions which, when implemented by a computer, implement a method as defined above.

The invention also relates to a system for monitoring an aircraft approach phase to a runway, the aircraft having a speed, the system including means for determining successive gateways of the aircraft relative to at least one characteristic point of an approach flight plan of the aircraft relative to the runway, and means for measuring the speed of the aircraft upon crossing a given gateway, wherein the system further includes means for computing a minimum deceleration distance up to a predetermined target speed associated with the gateway following said given gateway, the minimum deceleration distance being an estimated flight distance corresponding to the speed reduction of the aircraft from the measured speed to said target speed, means for comparing the computed minimum deceleration distance with the distance remaining to be flown to the following gateway, and means for generating an alert, for the aircraft crew, when the distance remaining to be flown to the following gateway is smaller than the computed minimum deceleration distance.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION

Conventionally in this application, the expression "substantially equal to" will express a relationship of equality to within plus or minus 5%.

In the rest of the description, 1 f (feet) will designate one foot, equal to 0.3048 m, 1 Nm will designate 1 nautical mile, equal to 1,852 m, and 1 Kt will designate 1 knot, equal to 1,852 m/h, or 0.514 m·s$^{-1}$.

Figure 1:
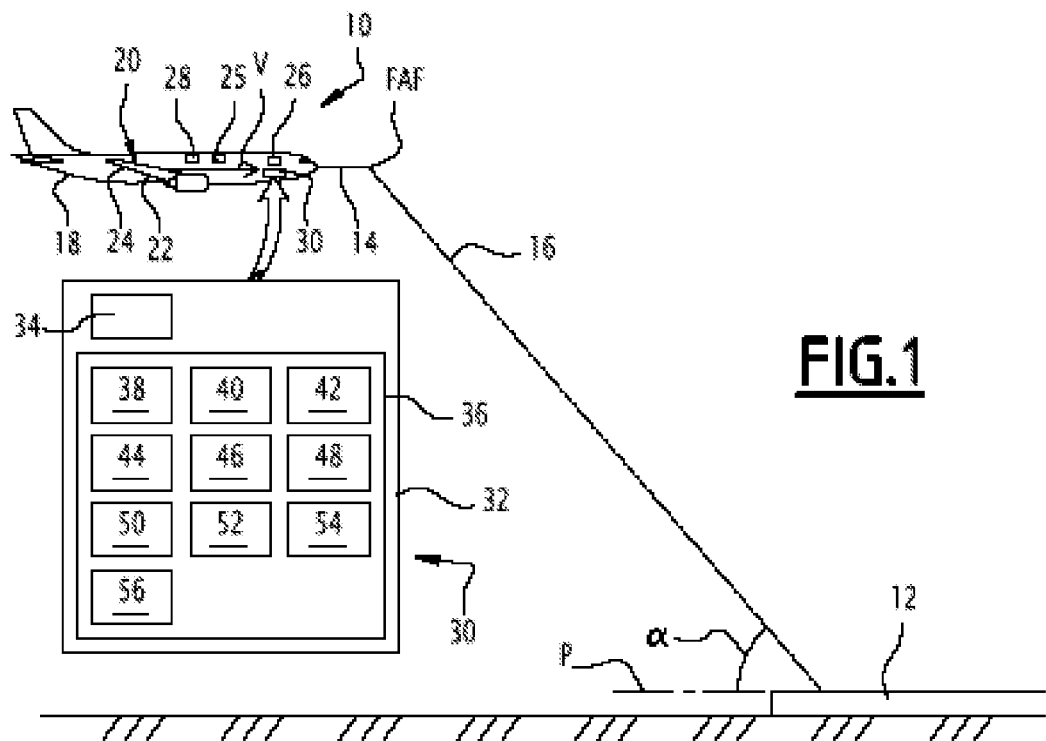
FIG. 1 is a diagrammatic illustration of an aircraft during the approach phase to a runway, the aircraft comprising a system for monitoring the approach phase, the monitoring system in particular including means for determining successive gateways of the aircraft and means for measuring the speed of the aircraft.

In FIG. 1, an aircraft 10 is in the approach phase to a runway 12, and is adapted move following a final level-off 14, then a final approach axis 16 toward the runway 12. The aircraft 10 has a mass M, as well as an instantaneous speed V relative to the land reference.

The aircraft 10 includes a fuselage 18 and wings 20, each wing 20 including, from the fuselage 18 to its free end, flaps 22 and ailerons 24.

The aircraft 10 also has landing gear, not shown, movable between a retracted configuration and a deployed configuration, the landing gear being in the retracted configuration in the example of FIG. 1 and then not being visible.

The aircraft 10 has an aircraft flight management system (FMS) 25, an automatic pilot device (AP) 26, a sensor 28 measuring the instantaneous speed V, and a system 30 for monitoring the approach phase to the runway 12.

The runway 12 is substantially flat, and defines a reference plane P.

The final level-off 14 is, for example, situated at an altitude substantially equal to 3,000 feet, i.e., 914.4 m, above the runway 12. Alternatively, the final level-off 14 is situated at an altitude substantially equal to 2,000 feet, i.e., 609.6 m, above the runway 12.

In the example of FIG. 1, the final level-off 14 is situated at an altitude substantially equal to 3,000 feet, and the intersection between the final level-off 14 and the final approach axis 16 then corresponds to the final approach fix (FAF), also called the final approach point (FAP). The altitude of the final approach fix FAF is then substantially equal to 914.4 m above the runway 12.

The final approach axis 16 has an angle α relative to the reference plane P of the runway. The value of the angle α is for example equal to 3 degrees.

The fuselage 18, the wings 20, the flaps 22, the ailerons 24, the flight management system 25 and the automatic pilot device 26 are known per se, and are not described in more detail. Each flap 22 has a turning angle, not shown, relative to the corresponding wing 20 of the aircraft.

The flight management system 25 includes a memory, not shown, adapted to store an approach flight plan of the aircraft 10, the approach flight plan in particular including the final approach fix FAF.

The monitoring system 30 includes at least one processing unit 32, for example formed by a processor 34 and memory 36 associated with the processor 34.

Figure 2:
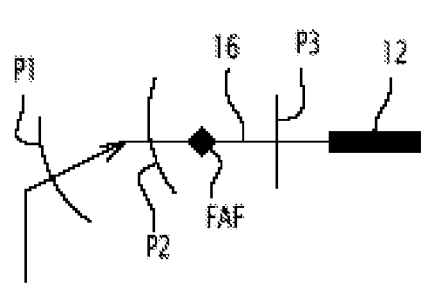
FIG. 2 is a diagrammatic illustration of first, second and third successive gateways of the aircraft during the approach phase.
Figure 3:
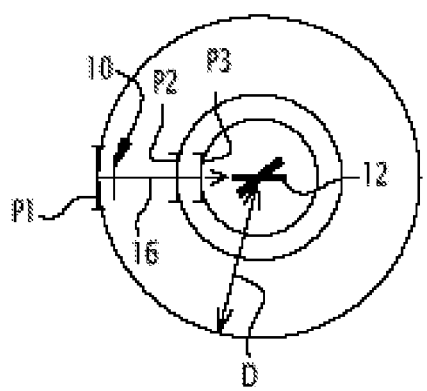
FIG. 3 is a view similar to that of FIG. 2 according to an alternative example.

The memory 36 is configured to store software 38 for determining successive gateways P1, P2, P3 of the aircraft, shown in FIGS. 2 and 3, software 40 for measuring the speed V of the aircraft upon crossing a given gateway P1, P2, P3, first software 42 for comparing the measured speed V with a predetermined maximum speed Vi_max, and first software 44 for generating a first alert, also called excess speed alert, for the aircraft crew, when the measured speed V is above the predetermined maximum speed Vi_max.

According to the example, the memory 36 is also configured to store first software 46 for computing a minimum deceleration distance Dmin_dec_j up to a predetermined target speed Vj_max associated with the following gateway Pj, j representing an index of the following gateway and being equal to 2 or 3 in the described example embodiment where three successive gateways P1, P2, P3 are determined by the determining software 38. The minimum deceleration distance Dmin_dec_j is an estimated flight distance corresponding to the speed reduction of the aircraft from the measured speed V to said target speed Vj_max.

The memory 36 is also configured to store second software 48 for computing a distance $D_{Pj}$ remaining to be flown to the following gateway Pi, second software 50 for comparing the computed minimum deceleration distance Dmin_dec_j with the distance remaining to be flown $D_{Pj}$ to the following gateway Pj, and second software 52 for generating a second alert, for the aircraft crew, when the distance remaining to be flown $D_{Pj}$ to the following gateway Pj is smaller than the computed minimum deceleration distance Dmin_dec_j.

Additionally, the memory 36 is configured to store third software 54 for computing a corrected wind slope, denoted Slope_air, the corrected wind slope Slope_air then being taken into account by the first computation software 46 to compute the minimum deceleration distance Dmin_dec_j. The slope is also called flight path angle (FPA) and the corrected wind slope is also called corrected wind flight path angle, denoted FPA_air.

Also additionally, the memory 36 is configured to store fourth software 56 for computing a ground slope, denoted Slope_ground, the ground slope Slope_ground then being taken into account by the third computation software 54 to compute the corrected wind slope. The ground slope is also called ground flight path angle, denoted FPA_ground.

Also additionally, the memory 36 is configured to store software 58 for commanding the automatic speed reduction of the aircraft 10 using the automatic pilot device 26, when the speed V measured upon crossing the given gateway Pi is above the predetermined maximum speed Vi_max, i representing an index of the given gateway.

Alternatively, the determining means 38, the measuring means 40, the comparing means 42, the first generating means 44, the first computation means 46, the second computation means 48, the second comparing means 50 and the second alert means 52 are made in the form of programmable logic components, or in the form of dedicated integrated circuits.

Alternatively, the third computation means 54 and the fourth computation means 56 are made in the form of programmable logic components, or in the form of dedicated integrated circuits. Alternatively, the control means 58 are made in the form of programmable logic components, or in the form of dedicated integrated circuits.

The determining software 38 is configured to determine the position of successive gateways Pi of the aircraft, i representing the index of the gateway, during the approach phase of the aircraft 10.

The last gateway P3 before the runway 12 is situated at a predetermined altitude above the runway 12. In other words, the position of the last gateway P3 is computed relative to the runway location. The altitude of the last gateway P3 is, for example, substantially equal to 304.8 m above the runway 12, i.e., substantially equal to 1,000 feet above said runway, for example when the aircraft 10 is on a direct approach toward the runway 12, as shown in FIG. 2. "Direct approach" refers to an approach in which the runway 12 is aligned with the final approach axis 16 including the final approach fix FAF.

Alternatively, the altitude of the last gateway P3 is substantially equal to 152.4 m above the runway 12, i.e., substantially equal to 500 feet above said runway, for example when the aircraft 10 is on an indirect approach toward the runway 12. In other words, the position of the last gateway P3 is computed relative to the landing location. "Indirect approach" refers to an approach in which the runway 12 is a different runway from that toward which the aircraft 10 is converging at the beginning of the approach phase; typically, this relates to so-called "tailwind" approaches, with the aircraft 10 converges toward the runway without landing, overflies it, then performs a half-turn in order to land from the opposite side.

The position of the gateway(s) preceding the last gateway P3 depends on the approach of the aircraft 10.

At least one gateway P1, P2 among the gateways preceding the last gateway P3 is, for example, determined as a function of a predefined distance remaining to be traveled along the approach trajectory, relative to the final approach fix FAF, as shown in FIG. 2, the final approach fix FAF being a characteristic point of the approach flight plan. When the approach trajectory follows the approach flight plan, the distance remaining to be traveled and the position of the gateway P1, P2 are computed based on information contained in the approach flight plan.

Alternatively, the distance remaining to be traveled is expressed, when outside the approach flight plan, by determining the likely trajectory to join the flight plan at the final approach fix FAF or nearby, that trajectory being adjusted as a function of the instantaneous trajectory of the aircraft to determine the most likely distance remaining to be flown to reach that point. This is for example the case of an approach trajectory converging with the final approach axis 16, with tailwind, with a trajectory to join the flight plan converging with the final approach axis 16 from an angle different from the angle between the approach trajectory and the final approach axis 16, and the position of the gateway P1, P2 is then computed as a function of the distance remaining to be traveled along the trajectory to join the flight plan. As an additional example, when there is a tailwind, the aircraft 10 performs a sudden base turn without initial convergence, the position of the gateway P1, P2 is then computed considering the extension of the base step up to 2 Nm of the extension of the final approach axis 16 and next considering a convergence turn at 45° toward the final approach axis 16.

Alternatively, at least one gateway P1 from among the gateways preceding the last gateway P3 is determined as a function of the predefined distance relative to the position of the runway 12, as shown in FIG. 3. In other words, the position of the gateway P1 is then computed relative to the landing location.

The number of gateways Pi determined by the determining software 38 is preferably equal to three, and the index i is then equal to 1, 2 or 3.

In the example embodiment of FIG. 2, the first gateway P1 is situated at a distance substantially equal to 10 Nm, i.e., 18,520 m, from the final approach fix FAF and upstream thereof. The second gateway P2 is for example situated at a distance substantially equal to 1 Nm, i.e., 1,852 m, from the final approach fix FAF and upstream thereof.

The values of the distances of the first and second gateways P1, P2 relative to the final approach fix FAF are variables configurable by the determining software 38, the values of 10 Nm and 1 Nm being given as an example.

Alternatively, in the example of FIG. 3, the first gateway P1 is situated at a distance D from the position of the runway 12, the distance D for example being substantially equal to 15 Nm, i.e., 27,787 m. The second gateway P2 is situated at a predetermined altitude above the runway 12, for example substantially equal to 1,000 feet, i.e., 304.8 m, above said runway. The altitude of the last gateway P3 before the runway 12 is then, for example, substantially equal to 500 feet, i.e., 152.4 m, above the runway 12.

In the example of FIG. 3, when the position of the runway 12 is known, the latter is taken into account directly to compute the position of the different gateways P1, P2, P3. Otherwise, when the position of the runway 12 is not known, a reference position of the airport is taken into account, then a predetermined position correction is applied to the reference position of the airport in order to estimate the position of the runway 12.

The determination software 38 computes the position of the gateways Pi as a function of the planned trajectory of the aircraft 10, and the position of the gateways Pi is recomputed when the trajectory of the aircraft 10 is modified.

The first comparison software 42 is configured to compare the measured speed V upon crossing a given gateway P1, P2, P3, in particular upon crossing the first gateway P1 or the second gateway P2, with the predetermined maximum speed Vi_max for that gateway P1, P2, and the first generating software 44 is configured to generate the first alert in case of excess speed relative to the corresponding predetermined maximum speed Vi_max.

The predetermined maximum speed for the first gateway P1, denoted V1_max, is for example substantially equal to 315 Kt, i.e. 162 m·s$^{-1}$, when the aircraft 10 is a civil turbojet passenger airplane.

The predetermined maximum speed for the second gateway P2, denoted V2_max, is for example substantially equal to 200 Kt, i.e. 103 m·s$^{-1}$, when the aircraft 10 is a civil turbojet passenger airplane.

The values of the predetermined maximum speeds V1_max, V2_max depend on the type of the aircraft 10 and are configurable values, the values of 315 Kt and 200 Kt being given as an example for a civil turbojet passenger airplane.

According to the invention, the first computation software 46 is configured to compute, upon crossing the first gateway P1, the minimum deceleration distance Dmin_dec_j up to the predetermined target speed Vj_max associated with the following gateway Pj, j representing the index of the following gateway and being equal to 2 or 3 in the described example embodiment.

The minimum deceleration distance Dmin_dec_j is computed in particular as a function of the turning angle of the flaps 22 and the configuration of the landing gear, in order to take into account the fact that the capacity of the aircraft 10 to decelerate depends on the turning angle of the flaps 22, as well as the configuration of the landing gear, depending on whether the landing gear is retracted or deployed. In fact, the drag of the aircraft 10 is of course greater when the landing gear is deployed or when the value of the turning angle of the flaps 22 is maximal.

The minimum deceleration distance Dmin_dec_j is recomputed by the first computation software 46 each time the value of the turning angle of the flaps 22 and/or the configuration of the landing gear changes.

Additionally, the minimum deceleration distance Dmin_dec_j is further computed as a function of the corrected wind flight path angle FPA_air, computed using the third computation software 54.

The corrected wind flight path angle FPA_air for example verifies the following equation:

$$\text{FPA\_air} = \text{FPA\_ground} \times \frac{GS}{TAS} \quad (1)$$

where FPA_ground represents the ground flight path angle computed using the fourth computation software 56, GS represents the ground speed resulting from the wind from the measured airspeed, and TAS represents the measured airspeed.

The ground flight path angle FPA_ground for example verifies the following equation:

$$\text{FPA\_ground} = \text{Arctan}\left(\frac{\text{Altitude} - \text{Altitude\_Pj}}{D_{Pj}}\right) \quad (2)$$

where Altitude represents the current altitude of the aircraft 10, determined from the atmospheric pressure, Altitude_Pj represents the altitude of the following gateway Pj, and $D_{Pj}$ represents the distance remaining to be flown to the following gateway Pj.

Figure 4:
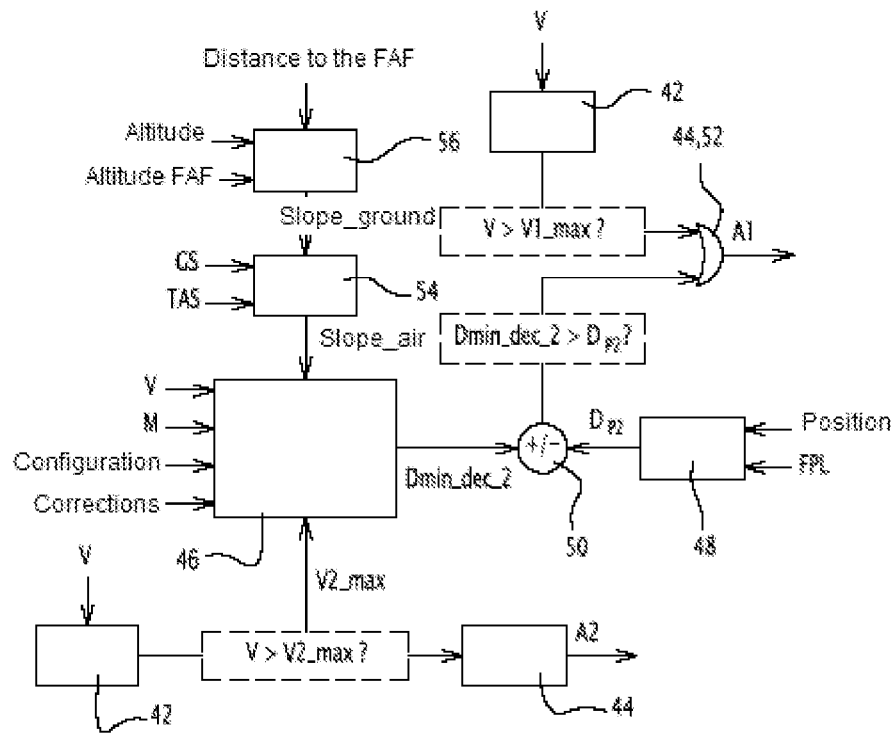
FIG. 4 is a diagrammatic illustration of the monitoring system of FIG. 1 for monitoring an aircraft associated with the first and second gateways.

In the example embodiment of FIG. 4, corresponding to the generation of the first announcement A1 upon crossing the first gateway P1, on the one hand, and a second announcement A2 upon crossing the second gateway P2, on the other hand, the altitude of the following gateway Pj, i.e., of the second gateway P2, is for example computed from the altitude of the final approach fix FAF. The altitude of the second gateway P2 is then equal to the sum of the altitude of the final approach fix FAF, for example 3,000 feet above the altitude of the runway 12, and an altitude gain resulting from the distance between the second gateway P2 and the final approach fix FAF. The altitude gain is for example equal to 100 feet, considering a slope of 1° over a distance of 1 Nm between the second gateway P2 and the final approach fix FAF.

Similarly, in the example embodiment of FIG. 4, the distance remaining to be flown to the second gateway P2 is computed from the distance remaining to the final approach fix FAF increased by the distance between the second gateway P2 and the final approach fix FAF, for example equal to 1 Nm.

The deceleration capacity of the aircraft 10 is computed by an algorithm, or is obtained from a predetermined performance table, like table 1 indicated below as an example.

TABLE 1

| Configuration (mass <60 t) | FPA_air (°) | Deceleration (Kt/Nm) |
|---|---|---|
| Smooth | 0 | 10 |
| Smooth | 1 | 4 |
| Smooth | 2 | 2 |
| Smooth | >2 | 0 |
| Flaps position 1, gear retracted | 0 | 15 |
| Flaps position 1, gear retracted | 1 | 10 |
| Flaps position 1, gear retracted | 2 | 7 |
| Flaps position 1, gear retracted | 3 | 5 |
| Flaps position 1, gear retracted | 4 | 1 |
| Flaps position 1, gear retracted | >4 | 0 |
| Flaps position 2, gear retracted | 0 | 20 |
| Flaps position 2, gear retracted | 1 | 15 |
| Flaps position 2, gear retracted | 2 | 12 |
| Flaps position 2, gear retracted | 3 | 9 |
| Flaps position 2, gear retracted | 4 | 5 |
| Flaps position 2, gear retracted | >4 | 0 |

Also additionally, the minimum deceleration distance Dmin_dec_j is further computed as a function of the altitude of the final level-off 14, for example by applying a deceleration correction when the altitude of the final level-off 14 exceeds 4,000 feet, i.e., exceeds 1,219.2 m. An increase in the minimum deceleration distance Dmin_dec_j is then applied, for example using table 2 below.

TABLE 2

| Altitude of the last level phase | Deceleration distance increase |
|---|---|
| 4,000 Ft | 0% |
| 8,000 Ft | 10% |
| 12,000 Ft | 50% |

Also additionally, the minimum deceleration distance Dmin_dec_j is further computed as a function of the mass M of the aircraft 10, for example for a given type of aircraft, by applying a deceleration correction when the mass M is greater than 60 tons. The minimum deceleration distance Dmin_dec_j is then for example increased by 1 Nm for each additional 5 tons.

In the example embodiment of FIG. 4, and according to the preceding, the first comparison software 42 is configured on one hand, from the speed V of the aircraft 10 received from the measuring software 40 upon crossing the first gateway P1, to compare the speed of the aircraft V with the predetermined maximum speed V1_max for the first gateway P1, and to send the result of the comparison to the first generating software 44, the first generating software 44 then being configured to generate the first alert via the first announcement A1 for the aircraft crew in case of excess speed relative to the maximum speed V1_max.

On the other hand, the first comparison software 42 is configured, from the speed V of the aircraft 10 received from the measuring software 40 upon crossing the second gateway P2, to compare the speed of the aircraft V with the predetermined maximum speed V2_max for the second gateway P2, and to send the result of the comparison to the first generating software 44, the first generating software 44 then being configured to generate the first alert via the second announcement A2 for the aircraft crew in case of excess speed relative to the maximum speed V2_max.

The fourth computation software 56 is then configured, from the current altitude of the aircraft 10, the altitude of the final approach fix FAF and the distance remaining to the final approach fix FAF, which are received as input, to compute the ground slope Slope_ground and to send the computed value of the ground slope to the third computation software 54.

The third computation software 54 is next configured, from the ground slope Slope_ground and speeds GS, TAS, which are received as input, to compute the corrected wind slope Slope_air and to send the computed value of the corrected wind slope Slope_air to the first computation software 46.

The first computation software 46 is then configured to compute the minimum deceleration distance Dmin_dec__2 to the predetermined target speed V2_max associated with the second gateway P2 from the target speed V2_max, the speed V, the configuration of the aircraft 10, i.e., the turning angle of the flaps 22 and the configuration of the landing gear, as well as, optionally, the corrected wind slope Slope_air, and the aforementioned corrections, in particular as a function of the mass, of the aircraft 10, that data being received as input. The first computation software 46 is then configured to send the computed value of the minimum deceleration distance Dmin_dec__2 to the second comparison software 50.

The second computation software 48 is configured to compute the distance $D_{P2}$ remaining to be flown to the second gateway P2, using the position of the aircraft 10 and the flight plan received as input by the FMS 25, and to send the computed value of the distance remaining to be flown $D_{P2}$ to the second comparison software 50.

The second comparison software 50 is then configured to compare the computed minimum deceleration distance Dmin_dec__2 with the distance remaining to be flown $D_{P2}$ to the second gateway P2, and to send the result of the comparison to the second generating software 52, the second generating software 52 then being configured to generate the second alert via the first announcement A1 for the aircraft crew when the distance remaining to be flown to the second gateway P2 is smaller than the computed minimum deceleration distance Dmin_dec__2.

Figure 5:
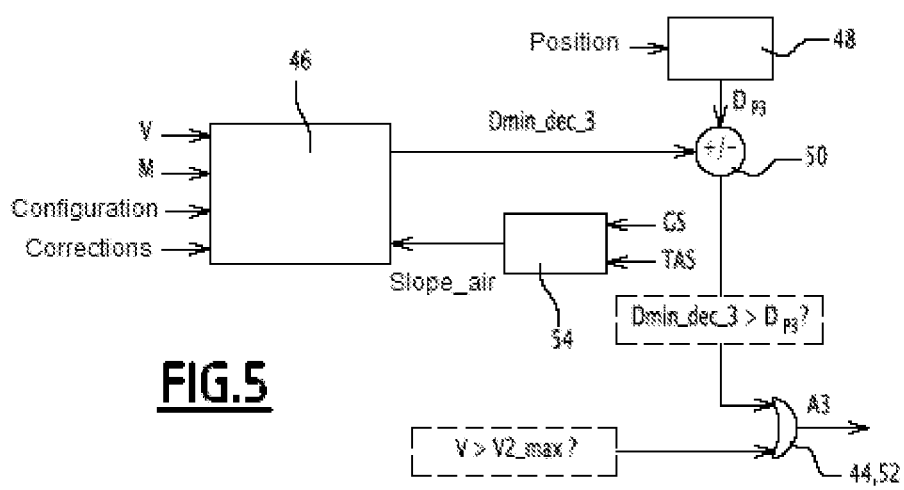
FIG. 5 is a view similar to that of FIG. 4 of the monitoring of the aircraft associated with the third gateway.

FIG. 5 illustrates the generation of a third announcement A3 at a moment comprised between the crossing of the second gateway P2 and the crossing of the last gateway P3, i.e., before crossing the last gateway P3, so that the crew of the aircraft 10 has time to take the third generated announcement A3 into account if necessary.

The first comparison software 42 is configured to compare the speed of the aircraft V with the predetermined maximum speed V2_max for the second gateway P2, from the speed V of the aircraft 10 received from the measuring software 40 upon crossing the second gateway P2, and to send the result of that comparison to the first generating software 44, the first generating software 44 then being configured to generate the first alert via the third announcement A3 for the aircraft crew in the event of an excess speed relative to the maximum speed V2_max.

The third computation software 54 is configured, from the speeds GS, TAS, which are received as input, to compute the corrected wind slope Slope_air and to send the computed value of the corrected wind slope Slope_air to the first computation software 46. The computation of the corrected wind slope Slope_air is done from a predetermined value of the ground slope Slope_ground stored in a database of the flight management system 25 or from the value of the ground slope Slope_ground computed using the aforementioned equation (2), i.e., from the altitude difference between the instantaneous altitude of the aircraft and that to be reached at the second gateway P2.

Alternatively, the effect of the wind on the computation of the minimum deceleration distance Dmin_dec_j is taken into account using a correction table, like table 4 indicated below as an example.

The first computation software 46 is configured to compute the minimum deceleration distance Dmin_dec__3 up to the target speed V3_max associated with the last gateway P3 from the speed V, the configuration of the aircraft 10, i.e., the turning angle of the flaps 22 and the configuration of the landing gear, as well as, optionally, the corrected wind slope Slope_air, and the aforementioned corrections, in particular as a function of the mass, of the aircraft 10, those data being received as input. The computation of the deceleration Dmin_dec__3 will be described in more detail below.

The target speed V3_max is preferably less than 200 Kt, for example equal to 130 Kt.

The first computation software 46 is then configured to send the computed value of the minimum deceleration distance Dmin_dec__3 to the second comparison software 50.

The second computation software 48 is configured to compute the distance $D_{P3}$ remaining to be flown to the last gateway P3, using the position of the aircraft 10 and the flight plan that are received as input from the FMS 25, and to send the computed value of the distance remaining to be flown $D_{P3}$ to the second comparison software 50.

The second comparison software 50 is then configured to compare the computed minimum deceleration distance Dmin_dec__3 with the distance remaining to be flown $D_{P3}$ to the last gateway P3, and to send the result of the comparison to the second generating software 52. The second generating software 52 is then configured to generate a second alert via the third announcement A3 for the aircraft crew when the distance remaining to be flown to the last gateway P3 is smaller than the computed minimum deceleration distance Dmin_dec__3.

The computation of the deceleration distance Dmin_dec__3 will now be described in the event the altitude of the last gateway P3 is substantially equal to 1,000 feet above the runway 12, when the aircraft 10 is on a direct approach toward said runway. The computation of the deceleration Dmin_dec__3 will next be described in the event the altitude of the last gateway P3 is substantially equal to 500 feet above the runway 12, when the aircraft 10 is on an indirect approach toward said runway.

In the event the altitude of the last gateway P3 is substantially equal to 1,000 feet above the runway 12, the first computation software 46 computes the deceleration of the aircraft 10 from a performance table specific to the aircraft 10, like the table 3 indicated below as an example, and containing the distances traveled to configure the flaps 22 and the associated decelerations. From the speed obtained in the landing configuration, the first computation software 46 computes the distance necessary to reach the approach speed, i.e., the target speed V3_max associated with the last gateway P3, in that configuration.

TABLE 3

| Configuration adjustment | Distance (Nm) | Speed reduction (plan 3°) at the end (Kt) |
|---|---|---|
| flaps 0 → flaps 1 | 0.5 | 2 |
| flaps 1 → flaps 2 | 0.55 | 3 (from 3 to 10) |
| flaps 0 → flaps 0 + gear | 0.6 | 3 |
| flaps 1 → flaps 1 + gear | 0.5 | 4 |
| flaps 2 → flaps 2 + gear | 0.5 | 5 (from 5 to 10) |
| flaps 2 + gear → flaps 3 + gear | 0.25 | 6 |
| flaps 3 + gear → landing flaps + gear | 0.75 | 7 |

Additionally, the minimum deceleration distance Dmin_dec__3 is further calculated as a function of the angle α of the final approach axis 16 relative to the reference plane P of the runway 12, for example by applying a correction when the angle α varies around a reference value equal to 3°. A variation of +/−15% of the minimum deceleration distance Dmin_dec_3 is then applied per variation of +/−0.5° of the angle α around the reference value equal to 3°. As an example, a value of 4° for the angle α increases the minimum deceleration distance Dmin_dec_3 by 30%. Also as an example, a value of 2° for the angle α decreases the minimum deceleration distance Dmin_dec_3 by 30%.

Also additionally, the minimum deceleration distance Dmin_dec_3 is further computed as a function of the wind speed W, for example by applying a correction using table 4 provided below as an example.

TABLE 4

| Wind | Distance variation |
|---|---|
| Zero wind | Distance +0% |
| Headwind ≤20 Kt | Distance −6% |
| Headwind >20 Kt | Distance −12% |
| Tailwind ≤20 Kt | Distance +6% |
| Tailwind >20 Kt | Distance +12% |

The aforementioned corrections, as a function of the mass M of the aircraft 10, and respectively as a function of the altitude of the final level-off 14, for example using table 2, are also applicable to the computation of the minimum deceleration distance Dmin_dec_3.

At the end of the placement in the landing configuration, the aircraft 10 will have flown a distance equal to the sum of the adjustment distances of each configuration of configuration performance table 3. The speed will be the speed corresponding to the resulting overall deceleration.

The deceleration of the aircraft 10 is next computed in the landing configuration up to the approach speed V3_max associated with the last gateway P3. From the deceleration table of the configuration anticipated for landing, like table 5 provided below as an example, the approach speed relative to the landing configuration and the measured current wind speed, the first computation software 46 computes the air slope Slope_air and the minimum deceleration distance Dmin_dec_3 toward the approach speed V3_max.

TABLE 5

| Configuration (mass <60 t) | Air slope (°) | Deceleration (Kt/Nm) |
|---|---|---|
| Flaps position 3, gear deployed | 1 | 17 |
| Flaps position 3, gear deployed | 2 | 14 |
| Flaps position 3, gear deployed | 3 | 10 |
| Flaps position 3, gear deployed | 4 | 7 |
| Flaps position 3, gear deployed | >4 | 2 |
| Flaps position 4, gear deployed | 1 | 20 |
| Flaps position 4, gear deployed | 2 | 17 |
| Flaps position 4, gear deployed | 3 | 15 |
| Flaps position 4, gear deployed | 4 | 9 |
| Flaps position 4, gear deployed | >4 | 4 |

The first computation software 46 is configured to reiterate the computation of the minimum deceleration distance Dmin_dec_3, for the potential generation of the second alert via the third announcement A3, in case of a change in the position of the flaps 22, or in case of a significant change in the wind speed W, such as a variation of at least 15 Kt, when the aircraft 10 moves along the final approach axis 16, or in case of a significant change in the speed V of the aircraft 10 during the final descent, for example resulting from the use of an aero-brake.

In the event the altitude of the last gateway P3 is substantially equal to 500 feet above the runway 12, the aircraft 10 being on an indirect approach, the last gateway P3 is situated after an intermediate level-off bringing the aircraft 10 toward another runway, its position is remote from the approach plan of the previous case.

According to the standard procedures defined by aviators, the intermediate level-off occurs with flap turning and potentially the landing gear deployed, procuring a considerable deceleration capacity on the approach to the last gateway P3. In light of the reduced speed to conduct the approach, the first computation software 46 uses a simplified consideration to compute the minimum deceleration distance Dmin_dec_3 toward the last gateway P3. The stabilization objective in the last gateway P3 is the landing configuration at the intermediate approach speed to that gateway, computed by interpolation between the approach speed for landing and the intermediate approach speed on the joint level phase (or when the final axis 16 is left in the case of an indirect approach resulting from a "bayonet" for a parallel runway).

The first computation software 46 computes a distance D2 equal to the distance between the last gateway P3 at the altitude ALTairpt of the airport 12 increased by 500 feet and the current altitude of the aircraft 10 on the level-off, denoted ALTpalier. The distance D2 then verifies the following equation:

$$D2 = \left( \frac{ALTpalier - ALTairpt - 500}{\tan(3°)} \right) \quad (3)$$

The value of the distance D2 is for example comprised between 2 Nm and 4 Nm.

The speed is not known in advance at the level-off endpoint upon breaking the slope, and the first computation software 46 computes the minimum deceleration distance Dmin_dec_3 on the descent plan at 3°. If the minimum deceleration distance Dmin_dec_3 is not compatible with the distance remaining to be flown on that plan to the final gateway P3, the first computation software 46 computes part of the deceleration on the descent plan, then the rest of the deceleration on the preceding level-off. The computation is then done in the opposite direction, moving away from the runway 12.

In the event the landing configuration is done on the level-off, the first computation software 46 considers the minimum deceleration distance Dmin_dec_3, either completely on the distance D2 if the latter is sufficient, or partially on the distance D2 and partially on the end of the level-off.

To that end, the first computation software 46 computes the minimum deceleration distance Dmin_dec_3 in the landing configuration from the current wind speed currently measured toward the intermediate approach speed V3_max associated with the last gateway P3, and the second comparison software 50 compares the minimum deceleration distance Dmin_dec_3 to the distance D2.

If the distance D2 is larger, the total deceleration occurs on the descent plan. Otherwise, the speed at the level-off endpoint is computed, as well as the level-off deceleration.

The first computation software 46 positions the deceleration start point, which will be the first point where the deceleration toward the approach speed is to be initiated to satisfy the speed stabilization, at the last gateway P3 at 500 feet from the landing location.

The deceleration of the aircraft 10 is next computed in particular from a level-off deceleration table, like table 6 indicated below as an example.

TABLE 6

| Configuration (mass <60 t) | Deceleration (Kt/Nm) |
|---|---|
| Flaps position 3, gear deployed | 22 |
| Flaps position 4, gear deployed | 27 |

In the event the aircraft 10 is not in the landing configuration on the tailwind level-off, but in the intermediate configuration, the first computation software 46 computes the deceleration in the landing configuration on the plan at 3°, or on the plan and on the level-off as previously explained if the distance D2 on the plan is smaller than the distance necessary to decelerate toward the approach speed in the landing configuration. To simplify the algorithm, the configuration deceleration to go from the preceding configuration to the landing configuration is computed on the plan at 3° as well, while assigning a slight conservation effect relative to the case where the configuration deceleration has been done on the level-off. In fact, on descent, the deceleration capacity being lower than during level-off, the resulting deceleration distance in the descent phase is greater than if that computation had been done in the level-off. The resulting announcement point is then further from the last gateway P3 rising toward the aircraft. The distances for placement in the landing configuration and deceleration is added from the position of the last gateway P3 arising from the descent plan 3° toward the intermediate level-off.

The placement in preceding configurations if necessary (for example, from configuration 2 to 3) and associated decelerations are computed on the level-off. In the event the latter are done partially on a longer descent plan, the slight conservation effect of the deceleration relative to the last placement in configuration will offset the non-conservation tendency of the leveled-off deceleration of the placements in the intermediate configuration. The associated distances are small, such as distances in the vicinity of several Nm. As a result, the level or non-level hypothetical considerations are used to compute the configuration distances, but the minimum deceleration distance Dmin_dec_3 is computed from the position of the last gateway P3 along the flight plan, countercurrent.

According to aviators' standard operating procedure (SOP), the placement of the flaps in configuration is limited on a circuit for another runway; the majority of the configuration is already done at the beginning of level-off. For example, for landing planned in configuration 4, the aircraft 10 has configuration 3, gear deployed at the end of the level-off, potentially configuration 2 geared deployed, and at most two placements of the flaps in the landing configuration are then necessary according to table 7 provided below as an example.

TABLE 7

| Configuration adjustment | Distance (Nm) | Speed reduction in level-off (Kt) |
|---|---|---|
| flaps 2 → flaps 2 + gear | 0.5 | 7 |
| flaps 2 + gear → flaps 3 + gear | 0.25 | 8 (value probably much lower) |
| flaps 3 + gear → flaps 4 + gear | 0.75 | 9 |

Figure 6:
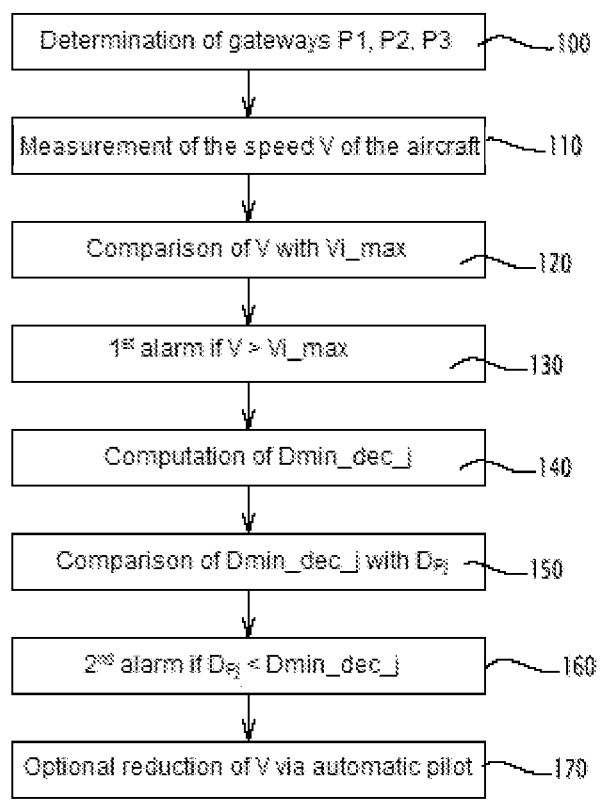
FIG. 6 is a flowchart of a method for monitoring the approach phase of the aircraft.

Thus, during monitoring of the approach phase, the monitoring system 30 begins by determining, during the initial step 100, the successive gateways P1, P2, P3 of the aircraft 10, as shown in FIG. 6 illustrating an example of the monitoring method. The position of the gateways Pi is recomputed when the trajectory of the aircraft 10 is modified.

During step 110, the monitoring system 30 next measures the speed V of the aircraft during crossing of the given gateway P1, P2, and compares it, during step 120, with the corresponding predetermined maximum speed V1_max, V2_max.

The first alert is then generated, during step 130, via the first, second and/or third announcement A1, A2, A3 for the aircraft crew, when the measured speed V is above the predetermined maximum speed V1_max, V2_max.

According to the invention, the monitoring system 30 further computes, during step 140, the minimum deceleration distance Dmin_dec_j to the predetermined target speed Vj_max associated with the following gateway, and during step 150, compares the computed minimum deceleration distance Dmin_dec_j with the distance remaining to be flown $D_{pj}$ to the following gateway Pj.

The second alert is then generated, during step 160, via the first and/or third announcement A1, A3, for the aircraft crew, when the distance remaining to be flown $D_{Pj}$ to the following gateway Pj is smaller than the computed minimum deceleration distance Dmin_dec_j.

The minimum deceleration distance Dmin_dec_j is recomputed each time the value of the turning angle of the flaps 22 and/or the configuration of the landing gear changes, and the second alert is generated if the distance remaining to be flown DPj to the following gateway Pj is smaller than the recomputed minimum deceleration distance Dmin_dec_j. In other words, when the value of the turning angle of the flaps 22 and/or the configuration of the landing gear changes, steps 140 to 160 are reiterated.

Additionally, during step 170, the monitoring system 30 commands the automatic reduction of the aircraft speed V using the automatic pilot device 26 at the appropriate time during approach to continue to satisfy the vertical descent profile, when the speed measured upon crossing the given gateway Pi is above the predetermined maximum speed Vi_max and/or when the distance remaining to be flown DPj to the following gateway Pj is smaller than the computed minimum deceleration distance Dmin_dec_j.

The monitoring system 30 according to this example makes it possible to alert the aircraft crew in advance of an approach whereof the predictive deceleration computation considers it to be non-stabilized in advance. The concept of anticipation has the advantage of allowing corrective action to converge toward the stabilization objective.

The monitoring system 30 further makes it possible to warn the pilot of potential airplane energy problems independent of the computations along the flight plan, and is also generally usable for approaches outside the flight plan (radar guidance) and sight approaches (direct, circling).

The monitoring system 30 assists the pilot in becoming aware of an excessive approach speed that will not make it possible to decelerate to the approach stabilization speed for landing, and then allows a corrective deceleration action with the aim of reducing the cost of a go-around, the risk of a hard landing, the risk a runway overrun, or the risk of wear of the braking system, etc. The monitoring system 30 thus improves the safety of the approach to the runway 12 while adapting to the ATC (Air Traffic Control) approach spacing context, speed regulation, and future approach concepts called "continuous descent" (CDA).

The first alert of the first gateway P1 indicates non-awareness of the excessive arrival speed. The first alert of the second gateway P2 warns of excessive speed for the final descent (generally over a slope of 3°).

When some jets are engaged in the final descent, deceleration is no longer possible if an intermediate flap configuration has not been previously deployed, implied over a slope at 3° or more, the aircraft 10 then can no longer decelerate in the smooth configuration (flap 0), engines idle and has not reached a sufficiently reduced speed to deploy the flaps in an intermediate configuration.

The second alert for the second gateway P2 then allows the reduced speed to authorize the placement of the flaps in configuration with the minimum drag configuration, which will allow a possible deployment of each flap turning without exceeding the deployment limit speed along the descent profile.

The comparison of the speed V of the aircraft with the maximum speed associated with the last gateway crossed is justified beyond the first gateway P1 to avoid an excessive speed upon approach with respect to the second gateway P2 that would compromise the final approach, the first gateway P1 having been exceeded within the allowances.

Following the generation of the announcement A1, A2, A3, the monitoring system 30 allows the pilot the option of taking corrective action, in particular from aero-brake means, since the aero-brake means are not taken into account in the deceleration computations.

When the speed and deceleration capacity are such that the success of the approach is compromised, the first gateway P1 is positioned as an early reminder regarding a situation that was incorrectly engaged from the start. The second gateway P2 allows positioning on the final descent plan under conditions making it possible to continue to decelerate on a descent plan no longer offering the deceleration capacity of the level-off or low slope. Once engaged on the descent plan with no initial configuration, it is, however, often difficult to correct the situation, although some airplanes are good gliders. The last gateway P3 is the purpose of the monitoring method and system 30 according to the invention, with the aim of stabilization at 1,000 feet or 500 feet, according to the aviator or air carrier, above the runway 12.

One can see that the monitoring method and system 30 according to the invention make it possible to improve flight safety, while best helping the aircraft crew to manage that approach phase, favoring stabilization in terms of approach speed.

The invention claimed is:

1. A method for monitoring the approach phase of an aircraft to a runway, the aircraft having a speed, the method comprising the following steps:
   determining successive gateways of the aircraft relative to at least one characteristic point of an approach flight plan of the aircraft or relative to the runway location, each gateway being a point of the flight plan and each gateway being away from the runway,
   measuring the speed of the aircraft at a given gateway,
   computing a minimum deceleration distance up to a predetermined target speed associated with a next gateway, the next gateway following said given gateway, the minimum deceleration distance being an estimated flight distance corresponding to the speed reduction of the aircraft from the measured speed to said target speed,
   comparing the computed minimum deceleration distance to a remaining distance to be flown up to the next gateway and
   generating an alert, intended for the aircraft crew, when the distance remaining to be flown up to the next gateway is smaller than the computed minimum deceleration distance.

2. The method according to claim 1, wherein the last gateway before the runway is situated at a predetermined altitude above the runway.

3. The method according to claim 2, the predetermined altitude is an altitude substantially equal to one of 304.8 m or 152.4 m above the runway.

4. The method according to claim 1, wherein the aircraft includes landing gear and flaps, the landing gear being in the retracted configuration or the deployed configuration, and each flap having a turning angle relative to a corresponding wing of the aircraft, and wherein computing the minimum deceleration distance is based on the turning angle of the flaps and the configuration of the landing gear.

5. The method according to claim 4, further comprising the step of recomputing the minimum deceleration distance each time the turning angle of the flaps and/or the configuration of the landing gear changes.

6. The method according to claim 4, further comprising the step of computing the minimum deceleration distance based on a corrected wind slope, the corrected wind slope being computed from a ground slope.

7. The method according to claim 6, wherein the ground slope preferably having a predetermined value or a value computed as a function of the difference between the altitude of the aircraft and the altitude of the next gateway.

8. The method according to claim 4, further comprising the step of computing the minimum deceleration distance as a function of the mass of the aircraft.

9. The method according to claim 4, wherein the aircraft is configured to move following a final level-off before beginning its descent along the final approach axis toward the runway, the final level-off having an altitude above the runway, and
   computing the minimum deceleration distance as a function of said altitude of the final level-off.

10. The method according to claim 1, wherein during the approach phase, the aircraft is adapted to move along a final approach axis toward the runway, and
    wherein determining at least one gateway as a function of a predefined distance relative to a point of the final approach axis.

11. The method according to claim 10, wherein the point of the final approach axis is the final approach fix situated at an altitude substantially equal to 914.4 m above the runway.

12. The method according to claim 1, wherein the method further comprises:
    comparing the speed measured at a given gateway with a maximum predetermined speed, and
    generating an excess speed alert, intended for the aircraft crew, when the measured speed is above the maximum predetermined speed.

13. The method according to claim 1, wherein the aircraft further comprises an automatic pilot device, and
    wherein the method further comprises automatically reducing the speed of the aircraft using the automatic pilot device when the speed measured at the given gateway is above the predetermined maximum speed.

14. A computer program product including software instructions which, when implemented by a computer, implement the method according to claim 1.

15. A system for monitoring an aircraft approach phase to a runway, the aircraft having a speed, and the system comprising:
    a gateway unit determining successive gateways of the aircraft relative to at least one characteristic point of an approach flight plan of the aircraft relative to the runway location, each gateway being a point of the flight plan and each gateway being away from the runway,
    a speedometer measuring the speed of the aircraft at a given gateway, a processor computing a minimum deceleration distance up to a predetermined target speed associated with a next gateway the next gateway following said given gateway, the minimum deceleration distance being an estimated flight distance corresponding to the speed reduction of the aircraft from the measured speed to said target speed, a comparing unit comparing the computed minimum deceleration distance with a distance remaining to be flown up to the next gateway, and an alarm generating an alert, for the aircraft crew, when the distance remaining to be flown up to the next gateway is smaller than the computed minimum deceleration distance.

* * * * *